July 7, 1959
H. BROWN ET AL
2,893,421
FLUID CONTROL TAP
Filed March 11, 1958
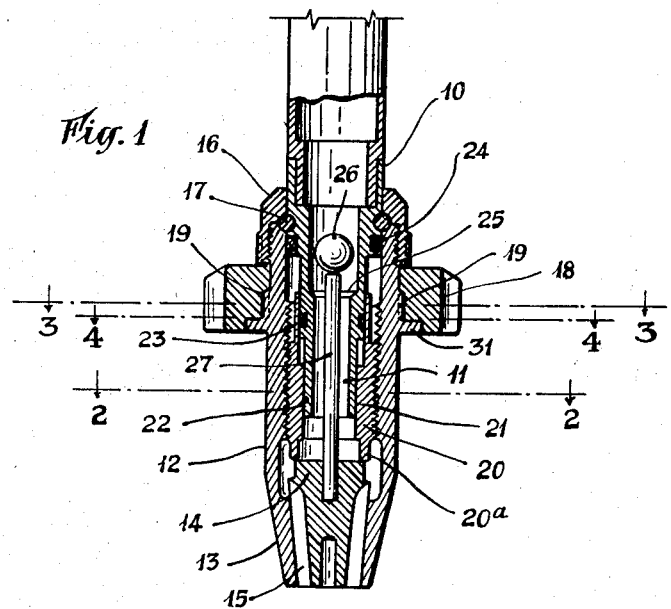
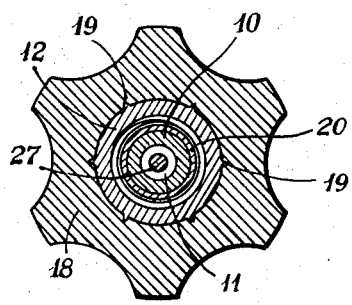
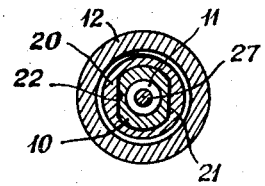
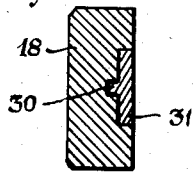
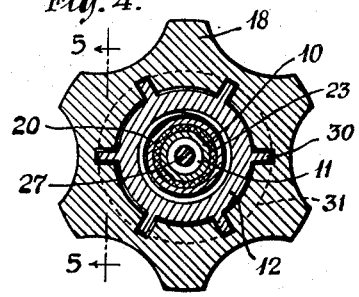

United States Patent Office 2,893,421
Patented July 7, 1959

2,893,421

FLUID CONTROL TAP

Harry Brown, Sprotborough, and John McPherson, Balby, England, assignors to Peglers Limited, Doncaster, England, a British company Application March 11, 1958, Serial No. 720,757

Claims priority, application Great Britain March 18, 1957

9 Claims. (Cl. 137—329.3)

This invention relates to fluid control taps, more particularly domestic and similar water taps of the kind in which an inner hollow body adapted for connection, at its upper end, fixedly to a water supply pipe rotatably carries a removable manually operable outer control sleeve having at the lower end thereof a discharge nozzle forming, in conjunction with said inner hollow body, a common axial fluid flow passage, a main valve member being supported interiorly of and by the nozzle for co-operating with a main valve seat in the flow passage under rotational movement of the control sleeve, said main valve member normally supporting an auxiliary valve member within said flow passage clear of an auxiliary valve seat therein which is spaced above the main valve seat and the main valve member permitting fall movement of the auxiliary valve member on to said auxiliary valve seat for closing the flow passage on removal of the control sleeve together with the main valve member from the inner hollow body.

An object of this invention is the provision, interposedly of the inner hollow body and the outer control sleeve, of an axially movable non-rotatable inner sleeve carrying the main valve seat, said inner sleeve being in helically threaded engagement with and interiorly of the outer control sleeve and in axial slidable engagement with the inner hollow body so that on manual rotation of the outer control sleeve, the main valve seat is movable therewith relatively to the main valve member, sealing means being provided between the outer control sleeve and the inner hollow body and between said inner hollow body and the axially movable inner sleeve, and means being provided for mounting the control sleeve for rotation upon the inner hollow body and the movable inner sleeve and said means being releasable from the control sleeve for permitting complete removal of said control sleeve.

Other objects will be apparent from the following description in which reference is had to the accompanying drawings.

In the drawings:

Fig. 1 is a sectional elevation of a water tap.

Fig. 2 is a cross section on the line 2—2 of Fig. 1.

Fig. 3 is a cross section on the line 3—3 of Fig. 1.

Fig. 4 is a cross section on the line 4—4 of a modification of Fig. 1.

Fig. 5 is a sectional detail view taken on the line 5—5 of Fig. 4.

The tap shown in Figs. 1, 2 and 3 of the drawings comprises an inner hollow body 10 adapted at its upper and enlarged end for connection to a water service pipe (not shown) so that the bore of said body provides a flow passage 11 for water.

Rotatably mounted by its upper end to the upper end of the body 10 is an outer control sleeve 12 having a frusto-conical nozzle 13 at its lower end which forms a continuation of and the discharge end of the flow passage 11 and supports therewithin a main valve member 14 of outwardly tapering form having external flutes 15 for the passage of water through the nozzle 13.

The bore of the nozzle is also of outwardly tapering form to support the main valve member 14.

The control sleeve 12 is rotatably retained on the body 10 by a retaining cap 16 which is in screw threaded engagement externally with the upper end of said control sleeve and rotatably retained upon the body by a split spring ring known in the trade as a "circlip" 17 which engages mating grooves in the body, the retaining cap and the control sleeve and thereby prevents axial movement of said cap and control sleeve over the body 10. For rotating the control sleeve 12 a manipulating handle 18 of plastic or other suitable non-metallic heat-insulating material is made as a tight fit thereon and has a splined engagement 19 at circumferential intervals as will be seen in Fig. 3.

Interposed between the control sleeve 12 and the body 10 is an inner sleeve 20 which is in screw threaded engagement with said control sleeve 12 and in axial slidable engagement with the body 10, a length of the bore of said inner sleeve having two diametrically opposite flat walls 21 engaging external flats 22 on the body 10 whereby rotation of the inner sleeve 20 is prevented, the arrangement being such that on rotation of the control sleeve 12 the inner sleeve 20 is caused to be traversed axially and slidably over the body 10.

The lower extremity of the inner sleeve 20 is provided with an annular seat 20a for engaging and disengaging the upper end of the main valve member 14 on axial slidable movement of said inner sleeve being effected by rotation in one direction or the other of the control sleeve 12, engagement of the seat 20a with the valve member 14 shutting off the flow of water through the tap.

A sealing ring 23 is provided between the inner sleeve 20 and the body 10 and another sealing ring 24 is provided where the upper end of the control sleeve 12 rotatably engages the upper end of the body 10.

An auxiliary valve seat 25 is provided in the upper part of the flow passage of the body 10 for an auxiliary ball valve member 26 which is normally maintained from engagement with its seat by a stem 27 upstanding from the main valve member 14, the arrangement being such that when it should be necessary to remove the control sleeve 12 for renewing the main valve member 14, the auxiliary valve member 26 automatically falls on to its seat 25 and closes the tap until the control sleeve and main valve member are replaced.

Instead of the manipulating handle 18 having the splined engagement 19 with the control sleeve 12 shown in Figs. 1 and 3, said handle may engage radial ribs 30 upstanding from the flange 31 of the control sleeve as shown in Figs. 4 and 5.

The main valve member 14 is of a non-metallic material such as a polyamide or polyethylene resin and the provision thereon of external flutes serves to provide anti-splash properties to the tap.

What we claim is:

1. In a fluid control tap, in combination with a fixed inner hollow body having a flow passage therethrough, an auxiliary valve seat and valve member located in said passage to control the flow of fluid therethrough and an outer control sleeve with integral discharge nozzle rotatable upon the inner hollow body and a main valve member supported in said nozzle, an axially displaceable inner sleeve non-rotatably mounted on said body and in helically threaded engagement interiorly with the outer control sleeve, a main valve seat on the displaceable inner sleeve co-axial with the auxiliary valve seat and movable with said inner sleeve for co-operating with the main valve member in the discharge nozzle and means on said main valve projecting into the inner hollow body and normally retaining the flow responsive valve in the unseated position.

2. A fluid control tap as claimed in claim 1, characterised by means mounting the control sleeve on the inner hollow body, said means comprising a retaining cap rotatably mounted on said inner body in screw thread engagement with the upper end of the control sleeve and rotatably retained by a split spring ring, said split ring engaging mating grooves in the inner hollow body, the retaining cap and the outer control sleeve.

3. A fluid control tap as claimed in claim 1, characterised in that a manipulating handle is fitted to the control sleeve, said handle being of heat insulating material and being interlocked with said sleeve against rotation relatively thereto.

4. A fluid control tap as claimed in claim 3, characterised in that the handle is interlocked with the control sleeve by radial lug and groove engagement with an annular flange on said control sleeve.

5. A fluid control tap as claimed in claim 1, characterised in that the inner hollow body and axially displaceable sleeve have non-circular engaging surfaces to prevent relative rotation between said body and sleeve.

6. A fluid control tap as claimed in claim 1, characterised by the provision of sealing means between the inner hollow body and inner sleeve and between said inner hollow body and the outer control sleeve.

7. A fluid control tap comprising an inner hollow body adapted for connection at its upper end fixedly to a water supply pipe, a manually operable control sleeve rotatably mounted at its upper end upon the inner hollow body and having a discharge nozzle at its lower end forming in conjunction with said inner hollow body a common axial flow passage, an inner sleeve in axially slidable non-rotatable engagement with the inner hollow body and in helically threaded engagement interiorly with the outer control sleeve and forming a part of the common flow passage, a main valve seat at the lower end of the inner sleeve, an auxiliary valve seat in the inner hollow body spaced above said main valve seat, a flow responsive valve member in the hollow body cooperating with said auxiliary valve seat, a main valve member in the discharge nozzle of the outer control sleeve, means carried by said main valve member normally supporting the flow responsive valve member clear of the flow responsive valve seat, sealing means between said outer control sleeve and the inner hollow body and between said inner hollow body and the inner sleeve, and means mounting the control sleeve rotatably upon the inner hollow body, said means being releasable for permitting complete removal of said control sleeve.

8. A fluid control tap as claimed in claim 7, characterised in that the discharge nozzle of the outer control sleeve is a frusto-conical nozzle, the main valve member therein being of complementary tapering form to retain itself therein and having a fluted conical surface providing passages between said valve and nozzle and forming anti-splash means.

9. A fluid control tap as claimed in claim 7 characterised in that the main valve member is composed of non-metallic material consisting of one of the materials, polyamide resin and polyethylene resin.

References Cited in the file of this patent

UNITED STATES PATENTS

| 688,314 | Kemp | Dec. 10, 1901 |
| 1,567,349 | Weber | Dec. 29, 1925 |

FOREIGN PATENTS

| 297,803 | Italy | June 21, 1932 |